United States Patent [19]

Kawasaki et al.

[11] 4,432,884

[45] Feb. 21, 1984

[54] SCALE INHIBITING AGENT

[75] Inventors: Yoshinari Kawasaki, Osaka; Kenji Hanno, Hirakata, both of Japan

[73] Assignee: Katayama Chemical Works Co., Ltd., Osaka, Japan

[21] Appl. No.: 399,816

[22] Filed: Jul. 19, 1982

[51] Int. Cl.$^3$ ............................................... C02F 5/12
[52] U.S. Cl. .................................... 252/180; 210/698; 210/701
[58] Field of Search ................. 252/180; 210/698, 701

[56] References Cited

U.S. PATENT DOCUMENTS 3,285,886 11/1966 Gunderson et al. ................ 252/180
3,965,027 6/1976 Boffardi et al. .................... 252/180
4,062,796 12/1977 Gardner et al. .................... 210/698

Primary Examiner—John E. Kittle
Assistant Examiner—Robert A. Wax
Attorney, Agent, or Firm—Hubbell, Cohen, Stiefel & Gross

[57] ABSTRACT

This invention relates to a scale inhibiting agent which comprises as an essential ingredient a copolymer of an alkylolamide compound such as N-methylol acrylamide, N-hydroxyethyl acrylamide or the like and an alkenyl compound such as acrylic acid, acrylamide, ethyl acrylate or the like.

8 Claims, No Drawings

SCALE INHIBITING AGENT

BACKGROUND OF THE INVENTION

1. Field of the Invention

This invention relates to a scale inhibiting agent. More particularly, it is concerned with a scale inhibiting agent which comprises an organic water soluble polymer as the active component.

2. Description of the Prior Art

Various industrial water systems have encountered problems with the deposition of scale. Heat exchangers which use industrial water which becomes hot in use are especially susceptible to scale depositions. The scale problem is magnified in cases wherein the water contains a considerable amount of components which make the water hard. Such components include alkali and alkali earth metal compounds. Also included are high concentrations of phosphate ions or heavy metal ions which are raised to high levels by the use of anticorrosives or the like. Representative examples of scales include calcium carbonate, calcium phosphate or very slightly soluble zinc compounds. Many useful inhibitors against calcium carbonate scale have been proposed and used. However, the agents effective against calcium phosphate or zinc compounds scale are not as numerous. In addition, the agents effective against all of the above three kinds of scales are not generally known.

It has been reported by U.S. Pat. No. 3,285,886 that a copolymer of carboxymethyl acrylamide and acrylic acid or like copolymers is useful as a scale inhibiting agent.

SUMMARY OF THE INVENTION

This invention provides a scale inhibiting agent comprising a copolymer of at least one of an alkylolamide compound having the general formula (I);

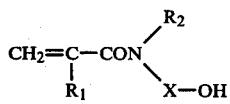

wherein $R_1$ and $R_2$ independently represent a hydrogen atom or an alkyl group having one to three carbon atoms, and X is a bond or a straight or branched-chain alkylene group having one to eight carbon atoms, and at least one of an alkenyl compound having the general formula (II);

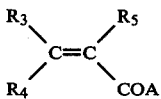

wherein $R_3$, $R_4$ and $R_5$ independently represent a hydrogen atom or methyl group; A is a hydroxy group or an $-OR_6$ group in which $R_6$ is a lower alkyl group which may be substituted by a hydroxy group, an amino group or an $-NHR_7$ group in which $R_7$ is a lower alkyl group which may be substituted by $-SO_3H$ at the end carbon atom.

Examples of the alkylolamide compounds of the general formula (I) are N-hydroxy acrylamide, N-hydroxy methacrylamide, N-methyl-N-hydroxy acrylamide, N-methylol acrylamide, N-methylol methacrylamide, N-methyl-N-methylol acrylamide, N-methyl-N-methylol methacrylamide, N-ethyl-N-methylol acrylamide, N-ethyl-N-methylol methacrylamide, N-hydroxyethyl acrylamide, N-hydroxyethyl methacrylamide, N-methyl-N-hydroxyethyl acrylamide, N-methyl-N-hydroxyethyl methacrylamide, N-ethyl-N-hydroxyethyl acrylamide, N-ethyl-N-hydroxyethyl methacrylamide, N-propyl-N-hydroxyethyl acrylamide, N-propyl-N-hydroxyethyl methacrylamide, N-hydroxypropyl acrylamide, N-hydroxypropyl methacrylamide, N-hydroxyisopropyl acrylamide and N-hydroxyisopropyl methacrylamide. Among these compounds, N-methylol acrylamide, N-methylol methacrylamide, N-hydroxyethyl acrylamide and N-hydroxyethyl methacrylamide are preferred from the viewpoints of convenience of synthesis and cost, Examples of the alkenyl compounds of the general formula (II) are acrylic acid, methacrylic acid, crotonic acid, isocrotonic acid, trans-2-methyl crotonic acid, 2-methyl-isocrotonic acid, acrylamide, methacrylamide, N-methyl acrylamide, N-ethyl acrylamide, N-propyl acrylamide, acrylamide-N-methylpropan-sulfonic acid [or N-(3-sulfo-2-methylpropyl)acrylamide], methyl acrylate, methyl methacrylate, methyl crotonate, ethyl acrylate, ethyl methacrylate, ethyl crotonate, propyl acrylate, propyl methacrylate, propyl crotonate, butyl acrylate, butyl methacrylate, 2-hydroxyethyl acrylate and 2-hydroxypropyl methacrylate. Preferred examples of these alkenyl compounds are acrylic acid, methacrylic acid, acrylamide, methacrylamide, acrylamide N-methylpropan-sulfonic acid, methyl acrylate, ethyl acrylate and hydroxyethyl acrylate.

The organic polymers to be employed in the invention are the copolymers which can be obtained by polymerizing at least one of the aforementioned alkylolamide compounds and at least one of the alkenyl compounds under known methods. The molecular weight of the copolymers are generally in the range of from about 500 to about 100,000, and more preferably in the range of from about 500 to about 20,000. When the molecular weight is over 100,000, the copolymer will exert a flocculating action which is not desirable when making the copolymers according to this invention. It is desirable to use the alkylolamide compound and the alkenyl compound in a molar ratio of from about 1:9 to about 9:1; for example, 1:1, 3:1 or 5:1. Alternatively, it is desirable to employ the alkylolamide compound in an amount of at least 10% (w/w) based on the total weight of the alkylolamide compound and the alkenyl compound.

The copolymers of the invention may be obtained by heating one or more alkylolamide monomers and one or more alkenyl monomers together with a polymerization initiator (e.g., inorganic or organic peroxide such as persulfate or benzoyl peroxide; azo-bis-isobutyronitril or redox catalyst) in a solvent of water, or in an organic solvent (e.g., lower alcohol, doxane or aromatic solvent) or its mixture with water. Further, if the polymerization is conducted under acidic conditions, it tends to yield a copolymer of three-dimensional crosslinked structure which lowers solubility and dispersibility in water. Accordingly, it is preferred to conduct polymerization under basic conditions by the addition of an alkali such as sodium hydroxide. However, the resulting copolymer whatever structure it has may be employed in this invention, as long as it possesses the desired solubility (inclusive of its converted salt form) and dispersibility.

The copolymer is required to be substantially soluble in water when used as a scale inhibitor. Thus, if the copolymer possesses less than the required solubility, it is desirable to convert its free carboxyl group into the corresponding salt to improve its solubility. Examples of suitable salts include lithium, sodium, potassium or ammonium salt. Sodium salt and potassium salt are presently preferred. The copolymer of the invention is generally employed in powder or liquid preparation form when used as a scale inhibitor. When the copolymer is used in liquid preparation form, it is convenient to use the aqueous solution of the copolymer as obtained by the above mentioned polymerization, so long as the copolymer is substantially soluble in water. It is desirable to add a polymerization inhibitor (e.g., hydroquinone) to such a liquid preparation in order to stop further polymerization in the liquid preparation.

The scale inhibiting agent of the invention may be used in the same manner as the prior art scale inhibiting agents. It is generally used in an amount of from about 0.5 ppm to about 300 ppm, depending upon the type of water systems being treated.

The scale inhibiting agent may also be used in combination with prior art scale inhibiting agents such as phosphonic acid, phosphonocarboxylic acid, ethylenediamine tetraacetic acid (EDTA), nitrirotriacetic acid (NTA), liqnin sulfonic acid, polyacrylic acid or polymaleic acid. Further it is possible to use it together with known anticorrosives. This is advantageous since the scale inhibiting agent will act to inhibit the formation of scale caused by the anticorrosive. Examples of suitable anticorrosives include polyphosphates, heavy metal salts (e.g., zinc, manganese or nickel salt), molybdates, oxycarboxylic acid salts and so forth.

The scale inhibiting agent of the invention is effective in preventing the formation of scale due to calcium carbonate as well as calcium phosphate and zinc compounds. It is also usable for scales of other sources.

The invention is illustrated by the following examples, without limitation to the scope of the invention.

EXAMPLE OF PREPARATION OF COPOLYMERS

A five-necked flask was equipped with stirrer, two dropping funnels, reflux condenser and thermometer. In it were placed 8 g (0.2 mol) of sodium hydroxide, which was dissolved in 100 ml of water under stirring. The solution was heated to 80° C., in which a solution of 17.2 g (0.2 mol) of methacrylic acid and 20.2 g (0.2 mol) of N-methylol acrylamide in 22.6 ml of water, and a solution of 4.6 g (0.02 mol) of ammonium persulfate in 27.4 ml of water were, under stirring, dropped in. The addition rate of the monomer solution and the ammonium persulfate solution was 5:3. During addition, the reaction mixture was kept at 75°–85° C. After completing the addition, the mixture was stirred for an additional 5 minutes and immediately cooled. The reaction was completed in 1–1.5 hours.

The molecular weight of the resulting copolymer of methacrylic acid and N-methylolacrylamide was estimated by an Ostwald viscometer.

The resulting mixture can be used as is, however, it is preferably subjected to a purification, e.g., cooling the mixture at −5° to −10° C. and filtering it to remove a precipitate.

The various copolymers mentioned below were prepared as described above except that the quantities and specific monomers and other reagents were varied.

EXAMPLE 1

The copolymers as shown in Table 1 below were used to test for inhibition of calcium carbonate scale.

TABLE 1

| Compound No. | Monomer constitution of copolymer | molar ratio | molecular weight |
|---|---|---|---|
| 1 | N—methylol acrylamide/methacrylic acid | (1/1) | ca. 5000 |
| 2 | N—methylol acrylamide/methacrylic acid | (1/5) | ca. 5000 |
| 3 | N—methylol acrylamide/methacrylic acid | (1/9) | ca. 5000 |
| 4 | N—hydroxyethyl acrylamide/acrylic acid | (1/1) | ca. 5500 |
| 5 | N—hydroxyethyl acrylamide/acrylic acid/acrylamide | (1/2/3) | ca. 15000 |
| 6 | N—methylol acrylamide/methacrylic acid/acrylamide | (1/2/4) | ca. 5000 |
| 7 | N—methylol acrylamide/methacrylic acid/methacrylamide | (4/2/1) | ca. 4500 |
| 8 | N—hydroxyethyl methacrylamide/acrylamide-N—methylpropan sulfonic acid | (4/1) | ca. 3500 |
| 9 | N—methylol acrylamide/acrylic acid/ethyl acrylate | (1/4/1) | ca. 5000 |
| 10 | N—methylol acrylamide/acrylamide/hydroxyethyl acrylate | (2/2/3) | ca. 6500 |
| 11 | N—hydroxyethyl acrylamide/acrylic acid/methyl acrylate | (2/5/1) | ca.3500 |
| 12 | N—methylol acrylamide/acrylic acid | (1/4) | ca. 750 |

(Test method):

The test solution was a pure water solution containing 100 ppm of calcium ion and 600 ppm of sodium hydrogen carbonate (as M-alkalinity). Each of the test compounds was added to 1 liter of the test solution so as to make a definite concentration. The mixture was stirred for two hours at 200 rpm, at 50° C., and then filtered through filtration paper (Toyo-roshi No. 6 supplied by Toyoroshi Co., Ltd., of Japan). The concentration of calcium ion in the filtrate was measured by an atomic absorption spectrometer (Hitachi 170-50 of Hitachi Manufacturing Co., Ltd., of Japan). A precipitated quantity of calcium carbonate ($CaCO_3$) scale per 1 liter of the test solution was calculated from a quantity of calcium ion precipitated during testing, that is the difference between the two calcium ion concentrations in the solutions before and after the test.

The results are shown in Table 2. The tests also used polyacrylic acid (molecular weight of about 5000) as a means of comparison.

TABLE 2

| Compound No. | Addition concentration | Quantity of precipitated calcium carbonate ($CaCO_3$) scale (mg/l) |
|---|---|---|
| Blank | — | 138.5 |
| 1 | 2.0 | 3.5 |
| 2 | 1.0 | 6.5 |
| 3 | 2.0 | 3.5 |
| 4 | 2.0 | 4.1 |
| 5 | 2.0 | 3.5 |
| 6 | 2.0 | 3.5 |
| 7 | 2.0 | 3.0 |
| 8 | 2.0 | 3.5 |
| 9 | 2.0 | 3.5 |
| 10 | 2.0 | 3.3 |
| 11 | 2.0 | 3.0 |
| 12 | 1.0 | 8.5 |
| 12 | 2.0 | 3.0 |
| (Comparative Test) | 2.0 | 3.5 |

TABLE 2-continued

| Compound No. | Addition concentration | Quantity of precipitated calcium carbonate (CaCO$_3$) scale (mg/l) |
|---|---|---|
| Polyacrylic acid (molecular weight ca. 5000) | | |

EXAMPLE 2

A test for inhibition of calcium phosphate scale was conducted using city water of Osaka city at three times its normal concentration. The quality of water used is shown in Table 3.

TABLE 3

| | |
|---|---|
| pH | 7.50 |
| electrical conductivity (μs/cm) | 750 |
| P-alkalinity (ppm) | 0 |
| M-alkalinity (ppm) | 61.5 |
| calcium hardness (ppm) | 98.6 |
| total hardness (ppm) | 157.0 |
| sulfate ion (ppm) | 39.5 |
| chloride ion (ppm) | 69.1 |
| silica (SiO$_2$) (ppm) | 10.5 |
| total iron (ppm) | 0.5 |

To 1 liter of the above concentrated water, sodium hexa-metaphosphate at the concentration of 20 ppm as $PO_4^{3-}$ and sodium hydrogen phosphate at the concentration of 20 ppm as $PO_4^{3-}$ were added. Then, each of the test compounds used in Example 1 was added at a definite concentration.

The mixture was stirred for 24 hours at 100 rpm at 50° C. Then, a quantity of each of the precipitated calcium ion and total phosphate was measured. The total quantity is deemed to be calcium phosphate scale.

The results are shown in Table 4.

TABLE 4

| Compound No. | Addition concentration | Quantity of precipitated calcium phosphate scale (mg/l) |
|---|---|---|
| Blank | — | 45.3 |
| 1 | 7 | 0.3 |
| 2 | 5 | 1.5 |
| 3 | 7 | 0.3 |
| 4 | 7 | 0.1 |
| 5 | 7 | 0.4 |
| 6 | 7 | 0.4 |
| 7 | 7 | 0.5 |
| 8 | 7 | 0.2 |
| 9 | 7 | 0.3 |
| 10 | 7 | 0.4 |
| 11 | 7 | 0.8 |
| 12 | 5 | 2.6 |
| 12 | 7 | 0.9 |
| (Comparative Test) polyacrylic acid (Molecular weight ca. 5000) | 10 | 25.9 |

EXAMPLE 3

The scale inhibition effects upon the combination of the inhibitors of this invention and various anticorrosives were examined. One liter of the water described in Example 2 was used as test water, to which test compounds were added so as to make a definite concentration. A mild steel plate [SPCC of Japanese Industrial Standard (JIS)G-3141:30×50×1 mm] which is hung on a stainless stirring bar was dipped in the test solution and stirred for five days at 100 rpm, at 50° C.

Before and after testing, magnesium ion, calcium ion, zinc ion and total phosphate ion were measured. Their total quantity is a precipitated ion quanity per 1 liter of test solution. A comparative example of sodium polyacrylate is also shown.

The results are shown in Table 5.

TABLE 5

| Scale inhibiting agent (ppm) | Anticorrosive (ppm) | Quantity of precipitated ion (mg/l) |
|---|---|---|
| Blank | Sodium citrate (40) + Zinc chloride (20) | 22 |
| Sodium polyacrylate (M.W. ca. 5000) (3.0) | Sodium citrate (40) + Zinc chloride (20) | 10 |
| Compound 1 (3.0) | Sodium citrate (40) + Zinc chloride (20) | 2 |
| Compound 4 (3.0) | Sodium citrate (40) + Zinc chloride (20) | 2 |
| Blank | Hexa-metaphosphate (20) + Zinc chloride (20) | 36 |
| Sodium polyacrylate (M.W. ca. 5000) (3.0) | Hexa-metaphosphate (20) + Zinc chloride (20) | 21 |
| Compound 4 (3.0) | Hexa-metaphosphate (20) + Zinc chloride (20) | 3 |
| Blank | Hexa-metaphosphate (20) + Zinc chloride (20) | 11 |
| Sodium polyacrylate (M.W. ca. 5000) (3.0) | Hexa-metaphosphate (20) + Zinc chloride (20) | 5 |
| Compound 7 (3.0) | Hexa-metaphosphate (20) + Zinc chloride (20) | 0 |
| Compound 12 (3.0) | Hexa-metaphosphate (20) + Zinc chloride (20) | 0 |

Example 4

A test was conducted at a blast furnace in a steel manufacturing plant in Japan. The scale of the retaining water was 3800 m$^3$. The circulating water was circulating at a rate of 780 m$^3$/hour. The air was being fed at a rate of 600,000 m$^3$/hour. An aqueous solution of N-metholyacrylamide-methacrylic acid copolymer (molar ratio: 1:1, molecular weight: 5,000) was continuously fed to water treated through the thickener so as to maintain it at the concentration of 0.45 ppm. After six months of operation, the adhesion of scale was scarcely found on the pipes, the impeller of the pump, and the board and the spray of the venturi scrubber in the blast furnace system.

Further, in order to check on the effectivenss during the test period, water from the thickener was examined as follows:

The water was directed to three lines having mild steel test tubes (inner diameter: ⅜ inch, length: 150 mm) for two weeks. One line was blank and the other two lines were fed with sodium polyacrylate and the copolymer according to this invention so as to maintain definite concentrations. The results are as follows:

| | Addition concentration | Quantity of scale adhered on test tube |
|---|---|---|
| Blank | 0 | 7.004 mg |
| Sodium polyacrylate (M.W. ca. 8000) | 1.2 | 0.7886 mg |
| N—methylol acrylamide/ Methacrylic acid copolymer (M.W. ca. 5000, mole. ratio 1:1) | 0.45 | 0.0296 mg |

The content of the scale yielded in the blank line was;

| | |
|---|---|
| heat reduced quantity | 19.24 (%) |
| acid insoluble part | 14.57 (%) |
| Fe ($Fe_2O_3$) | 9.72 (%) |
| Ca (CaO) | 26.22 (%) |
| Mg (MgO) | 0.63 (%) |
| Zn (ZnO) | 10.97 (%) |
| $CO_2$ | 4.40 (%) |

The average quality of water during the test was;

| | | |
|---|---|---|
| pH | 7.97 | |
| current conductivity | 3661 | (μs/cm) |
| M alkalinity | 2121 | (ppm) |
| P alkalinity | 0 | (ppm) |
| Ca hardness | 320 | (ppm) |
| $Cl^-$ ion | 11080 | (ppm) |
| SS (suspended solid) | 311 | (ppm) |
| total Zn | 24.5 | (ppm) |

What we claim is:

1. A scale inhibiting agent comprising as an active ingredient a copolymer of at least one of an alkylolamide compound having the general formula (I);

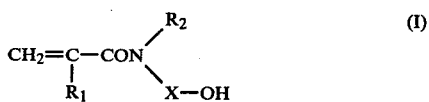
(I)

wherein $R_1$ and $R_2$ independently represent a hydrogen atom or an alkyl group having one to three carbon atoms, and X is a bond or a straight or branched-chain alkylene group having one to eight carbon atoms, and at least one of an alkenyl compound having the general formula (II);

(II)

wherein $R_3$, $R_4$ and $R_5$ independently represent a hydrogen atom or methyl group, and A is hydroxy group or —$OR_6$ group in which $R_6$ is a lower alkyl group of one to four carbon atoms which may be substituted by a hydroxy group; an amino group or an —$NHR_7$ group in which $R_7$ is a lower alkyl group of one to four carbon atoms which may be substituted by —$SO_3H$ at the end carbon atom.

2. A scale inhibiting agent of claim 1 in which the alkylolamide compound of the general formula (I) is N-hydroxy acrylamide, N-hydroxy methacrylamide, N-methyl-N-hydroxyacrylamide, N-methylol acrylamide, N-methylol methacrylamide, N-methyl-N-methylol acrylamide, N-methyl-N-methylol methacrylamide, N-ethyl-N-methylol acrylamide, N-ethyl-N-methylol methacrylamide, N-hydroxyethyl acrylamide, N-hydroxyethyl methacrylamide, N-methyl-N-hydroxyethyl acrylamide, N-methyl-N-hydroxyethyl methacrylamide, N-methyl-N-hydroxyethyl methacrylamide, N-ethyl-N-hydroxyethyl acrylamide, N-ethyl-N-hydroxyethyl methacrylamide, N-propyl-N-hydroxyethyl acrylamide, N-propyl-N-hydroxyethyl methacrylamide, N-hydroxypropyl acrylamide, N-hydroxypropyl methacrylamide, N-hydroxyisopropyl acrylamide or N-hydroxyisopropyl methacrylamide.

3. A scale inhibiting agent of claim 1 in which the alkylolamide compound is N-methylol acrylamide, N-methylol methacrylamide, N-hydroxyethyl acrylamide or N-hydroxyethyl methacrylamide.

4. A scale inhibiting agent of claim 1 in which the alkenyl compound of the general formula (II) is acrylic acid, methacrylic acid, crotonic acid, isocrotonic acid, trans-2-methylcrotonic acid, 2-methyl-isocrotonic acid, acrylamide, methacrylamide, N-methyl acrylamide, N-ethyl acrylamide, N-propyl acrylamide, acrylamide-N-methyl-propan sulfonic acid, methyl acrylate, methyl methacrylate, methyl crotonate, ethyl acrylate, ethyl methacrylate, ethyl crotonate, propyl acrylate, propyl methacrylate, propyl crotonate, butyl acrylate, butyl methacrylate, 2-hydroxyethyl acrylate or 2-hydroxypropyl methacrylate.

5. A scale inhibiting agent of claim 4 in which the alkenyl compound is acrylic acid, methacrylic acid, acrylamide, methacrylamide, acrylamide-N-methylpropan-sulfonic acid, methyl acrylate, ethylacrylate or hydroxyethyl acrylate.

6. A scale inhibiting agent of any of claims 1-5 in which the copolymer is obtained from the alkylolamide compound and the alkenyl compound which are present in a molar ratio of from about 1:9 to about 9:1.

7. A scale inhibiting agent of any claim 1-5 in which the copolymer has a molecular weight in the range of from about 500 to about 100,000.

8. A scale inhibiting agent of any claim 1-5 in which the copolymer has a molecular weight in the range of from about 500 to about 20,000.

* * * * *